(12) United States Patent
Yang et al.

(10) Patent No.: US 7,177,887 B2
(45) Date of Patent: Feb. 13, 2007

(54) REMOTE ONLINE INFORMATION BACK-UP SYSTEM

(76) Inventors: Qing Yang, 35D Meadow Tree Farm Rd., Saunderstown, RI (US) 02874; Jian Li, 301 Hasbrouck Apts., Ithaca, NY (US) 14850

( * ) Notice: Subject to any disclaimer, the term of this patent is extended or adjusted under 35 U.S.C. 154(b) by 453 days.

(21) Appl. No.: 10/659,127

(22) Filed: Sep. 10, 2003

(65) Prior Publication Data

US 2004/0117344 A1    Jun. 17, 2004

Related U.S. Application Data

(63) Continuation of application No. PCT/US02/07773, filed on Mar. 15, 2002.

(60) Provisional application No. 60/276,286, filed on Mar. 15, 2001, provisional application No. 60/287,946, filed on May 1, 2001, provisional application No. 60/312,471, filed on Aug. 15, 2001.

(51) Int. Cl.
   *G06F 17/00* (2006.01)
(52) U.S. Cl. ...................... 707/204; 707/201
(58) Field of Classification Search ................ 707/204, 707/10, 201; 714/5; 395/200; 295/186
   See application file for complete search history.

(56) References Cited

U.S. PATENT DOCUMENTS

| | | | |
|---|---|---|---|
| 5,754,888 A | 5/1998 | Yang et al. | 710/52 |
| 5,764,903 A | 6/1998 | Yu | 709/208 |
| 5,771,354 A * | 6/1998 | Crawford | 709/229 |
| 5,857,208 A * | 1/1999 | Ofek | 707/204 |
| 5,974,563 A * | 10/1999 | Beeler, Jr. | 714/5 |
| 6,092,066 A * | 7/2000 | Ofek | 707/10 |

* cited by examiner

*Primary Examiner*—Apu Mofiz
(74) *Attorney, Agent, or Firm*—Townsend and Townsend and Crew LLP

(57) ABSTRACT

A remote online information back-up comprises a local computing system and a remote computing system. The local computing system includes a local disk and a local device driver. The local device driver is responsive to requests from a local application executing on the local computing system, for selectively processing calls to the local disk or to a remote disk for backup of data resident on the local disk. The remote computing system includes the remote disk and a remote device driver. The remote device driver is responsive to calls from either the local device driver or calls from a remote application executing on the remote computing system, wherein calls from the local device driver are processed to perform backup operations to the remote disk of data resident on the local computing system.

22 Claims, 5 Drawing Sheets

REMOTE ONLINE INFORMATION BACK-UP SYSTEM

PRIORITY INFORMATION

This application claims priority from provisional application Ser. No. 60/276,286 filed Mar. 15, 2001; and from provisional application Ser. No. 60/287,946 filed May 1, 2001; and from provisional application Ser. No. 312,471 filed Aug. 15, 2001. Each of these applications are hereby incorporated by reference.

GOVERNMENT LICENSE

This invention was made with government support under Grant Nos. MIP-9714370 and CCR-0073377, awarded by the National Science Foundation. The government has certain rights in this invention.

BACKGROUND OF THE INVENTION

The invention relates to the field of data back-up systems, and in particular to a real-time online device drivers for a data back-up system.

A company's information assets (data) are critical to the operations of the company. Continuous availability of the data is a necessary. Therefore, backup systems are required to ensure continuous availability of the data in the event of system failure in the primary storage system. The cost in personnel and equipment of recreating lost data can run into hundreds of thousands dollars.

Local hardware replication techniques (e.g., mirrored disks) increase the fault tolerance of a system by keeping a backup copy readily available. To ensure continuous operation even in the presence of catastrophic failures, a backup copy of the primary data is maintained up-to-date at an off-site location. When backup occurs at periodic intervals rather than in real-time, data may be lost (i.e., the data updated since the last backup operation). A problem with conventional remote backup techniques is that they occur at the application program level. In addition, real-time online remote backup is relatively expensive and inefficient.

A storage area network (SAN) is a dedicated storage network in which systems and intelligent subsystems (e.g., primary and secondary) communicate with each other to control and manage the movement and storage of data from a central point. The foundation of a SAN is the hardware on which it is built. The high cost of hardware/software installation and maintenance makes SANs prohibitively expensive for all but the largest businesses.

A private backup network (PBN) is a network designed exclusively for backup traffic. Data management software is required to operate this network. It consequently increases system resource contention at the application level. The backup is not real-time, thus exposing the business to a risk of data loss. This configuration eliminates all backup traffic from the public network at the cost of installing and maintaining a separate network. Use of PBNs in business is limited due to the high cost.

A third known backup technique is database (DB) built-in backup. The increasing business reliance on databases has created greater demand and interest in backup procedure. Most commercial databases have built-in backup functionality. However, export/import utilities and offline backup routines are disruptive, since they lock database and associated structures, making the data inaccessible to all users. Because processing must cease in order to create the backup, this method of course does not provide real-time capabilities. The same is true for remote backup strategies, which add additional overhead to DB performance. While not achieving real-time capabilities the installation of any of these backup scheme is a time consuming and difficult task for the database administrator. (DBA)

Therefore, there is a need for a remote online information back-up system.

SUMMARY OF THE INVENTION

Briefly, according to an aspect of the invention, a remote online information back-up comprises a local computing system and a remote computing system. The local computing system includes a local disk and a local device driver. The local device driver is responsive to requests from a local application executing on the local computing system, for selectively processing calls to the local disk or to a remote disk for backup of data resident on the local disk. The remote computing system includes the remote disk and a remote device driver. The remote device driver is responsive to calls from either the local device driver or calls from a remote application executing on the remote computing system, wherein calls from the local device driver are processed to perform backup operations to the remote disk of data resident on the local computing system.

The backup technique of the present invention is implemented at the device driver level, and it achieves the backup by "cloning" every change of the local system to a network connected remote system.

The advantages of this system compared to the current prior art methods are it is easy to install, the backup is done at device driver level, it does not require any system changes, and it is easy to implement and maintain. Because the backup is done at the device driver level, it is completely transparent to both the operating system and application programs on the local system, as a result, after installation no further user intervention is needed, it is economical and efficient, it can do the entire system-wide real-time, online, remote backup for the minimal cost of a device driver.

These and other objects, features and advantages of the present invention will become apparent in light of the following detailed description of preferred embodiments thereof, as illustrated in the accompanying drawings.

DETAILED DESCRIPTION OF THE INVENTION

Figure 1:
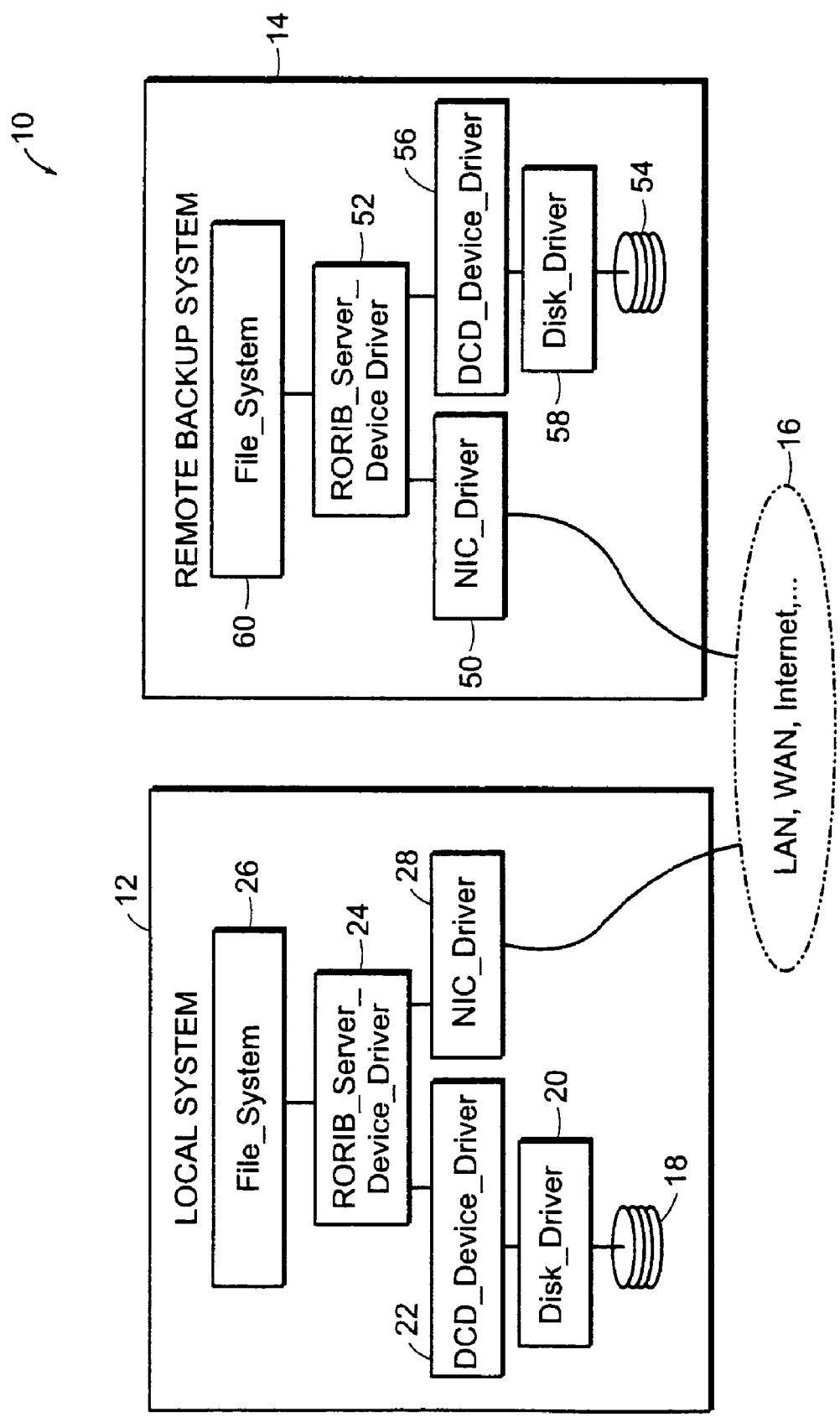
FIG. 1 is a block diagram illustration of a remote online information backup system.

FIG. 1 is a block diagram illustration of a remote online information backup system 10. The system 10 includes a local system 12 and a remote backup system 14, which may be connected via a communications medium 16 such as for example, a LAN, WAN, Internet, etc.

The local system 12 includes disk memory 18 (e.g., a plurality of disks arranged in a RAID architecture) that interface with a disk driver 20. The disk driver 20 interfaces with a disk-caching-disk (DCD) device driver 22, which communicates with a realtime online remote information backup (ROBIB) disk driver 22. The DCD architecture is disclosed in U.S. Pat. No. 5,754,888 entitled "System for Destaging Data During Idle Time By Transferring to Destage Buffer, Marking Segment Blank, Reordering Data in a Buffer, and Transferring to Beginning of Segment" and U.S. Pat. No. 6,243,795 entitled "Redundant, Asymmetrically Parallel Dick Cache for a Data Storage System", both hereby incorporated by reference.

The ROBIB device driver 24 is transparent to a user 26 (i.e., a file system and application programs) such as a Database Management System (DBMS). The ROBIB device driver 24 requires no changes to the existing operating system or physical data layout. As a result, it can be used as a "drop-in" filter between the traditional disk device driver and the file system.

The RORIB device driver 24 acts as bridge between the file system and the lower level device driver, such as a NIC driver 28 and the disk driver 26. Between the RORIB driver and raw disk driver 20 is the DCD driver 22, which increases small write performance. Such a multi-layer device driver approach reduces implementation overhead and increases portability.

The remote system 14 includes a NIC driver 50 that receives requests and data sent from the local system 12 via the network 16. The NIC driver passes the requests and data to a RORIB server device driver 52 that writes the data to back up system disk 54 via a remote system. DCD device driver 56 and disk driver 58. The RORIB server device driver 52 is also responsible to requests from a server application 60.

To back-up data to be written to the local disk 18, the RORIB client device driver 24 also writes the local data to the local NIC 28, which outputs the data to the network 16. The RORIB server device driver 52 then receives the local data communicated over the network 16 and writes the data to the backup disk 54.

The RORIB driver 24 receives various commands from the file system 26 for access to the local disk 18. Accesses to the local disk 18 require a determination of whether the local disk 18 is active or inactive to perform the commands requested by the file system 26. Therefore, the RORIB driver 24 determines whether the local disk 18 is active or inactive. The RORIB driver 24 sends commands to the DCD driver 24 to request the status of the local disk. The DCD driver 24 then notifies the local disk driver 20 to check whether the local disk 18 is active. The local disk driver 20 notifies the DCD driver 22 of its determination and the DCD driver 22 provides that determination to the RORIB driver 24. If it is determined that the local disk 18 is inactive, then the RORIB driver 24 issues a call to the NIC driver 28 to setup a connection with the remote backup system 14 in order to access the backup data. The NIC driver 28 provides an interface between the communication network 16 and a computing system, including the remote backup system 28. Also, the NIC driver provides the necessary protocol, such as TCP/IP, for sending and receiving messages from the network 16.

Once a connection is established, the remote backup system 14 proceeds to provide a backup technique that is transparent to the file system 26, applications, and user of the local system 12. The remote NIC driver 50 receives and sends messages over the network 16. When the remote NIC driver 50 receives a call from local NIC driver 28, the local disk 18 not being active, the remote NIC driver 50 processes the message and formats the message in a format appropriate for the RORIB 52 to process. The RORIB 52 sends a call the DCD driver 56 which issues a call to the disk driver 58 when needed to process command calls from the RORIB 52. Also, the file system 60 may also issue calls to the RORIB 52 to process commands internal to the remote backup system 14.

Figure 2:
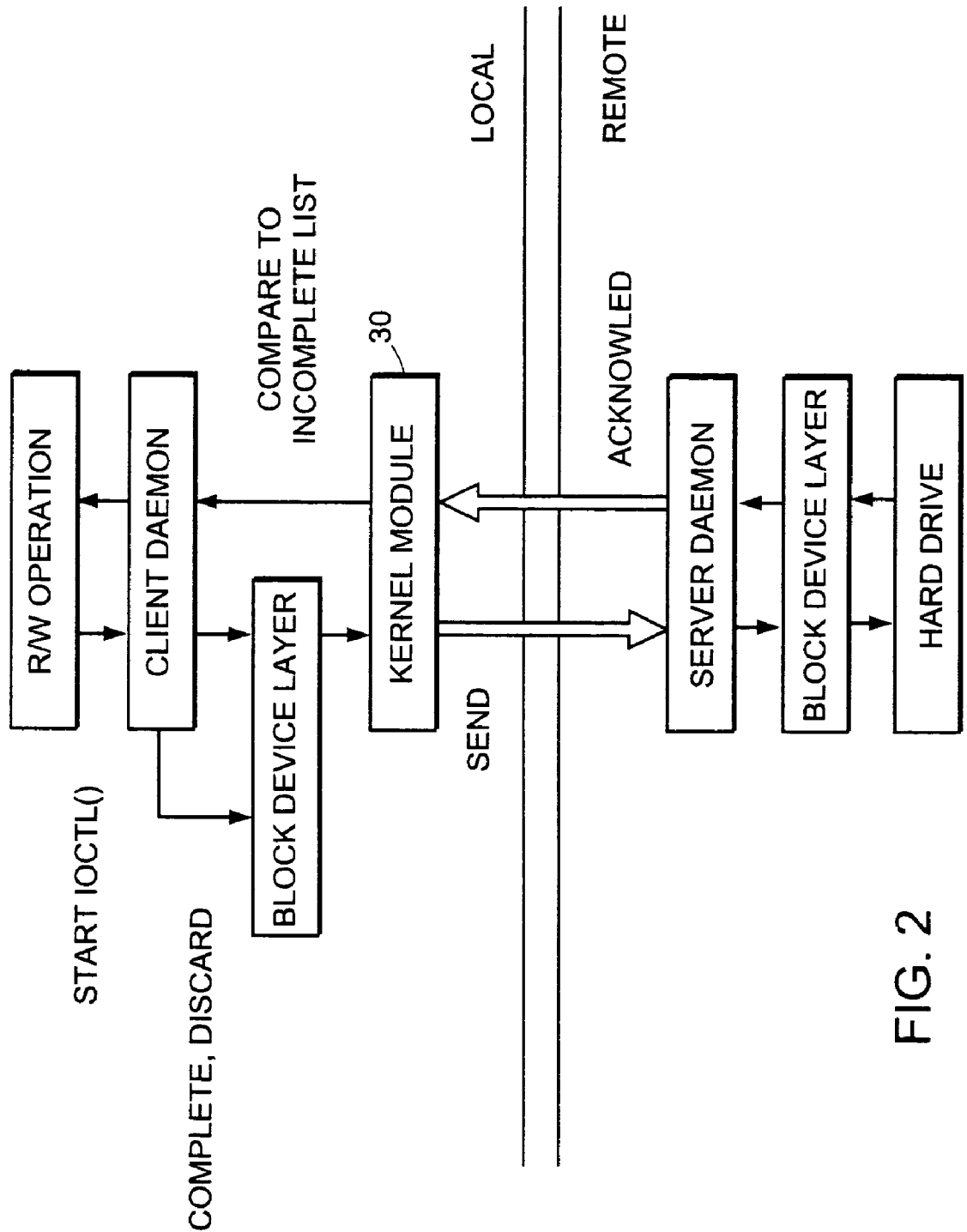
FIG. 2 is a block diagram illustration of communication between the local system and the remote system of the information backup system of FIG. 1.

FIG. 2 is a block diagram illustration of communication between the local system and the remote system 14 of the information backup system of FIG. 1. The driver 20 passes a file handle by a connected TCP socket (not shown) to a kernel driver 30. Because of this the kernel driver 30 does not have to expend resources to connect. The protocol is as follows: if the driver is asked to read from a block device, it sends a "request" packet. When the operation is complete, the server 16 responds with a "reply" packet. In other words, a client requests a local resource and thus generates a response from a daemon 24 (a memory-resident program) on the server via the driver. After setup, the client/server handshake begins when the server negotiates a connection with the client. If initialization is successful, connection occurs before timeout. The connection will be maintained, checked, renegotiated and recovered automatically by the server side daemon. Recovery is transparent to the user as long as there is currently one working connection.

The daemon is responsible for monitoring and maintaining all ports and sub-processes, which occurs transparent to the users. A complementary daemon also operates on the client. This daemon handles kernel requests made for data on local disk. The data are then passed across the network to the requesting server.

The RORIB device driver combines the functions of Internet protocol (IP) and storage drivers so that selected storage systems connected through the network (e.g., the Internet) appear to be a uniform storage system to a user. As a result, not only can the RORIB 16 provide realtime data backup, but also distributed data services to a company or an organization with decentralized offices.

The process can be implemented either using software at device driver level, or using hardware at a controller level. A test demo has been implemented using software at device driver level under Linux OS.

The backup technique of the present invention is implemented at the driver level, and as a result requires no change to the operating system (OS) and software applications. Thus reduces the overhead, it makes use of applicant's previous invention referred to as DCD (disk caching disk) to make realtime online back a reality.

For the device driver to communicate with the disk hardware directly, a multi-layered device driver approach was used. Implementation was achieved by adding the RORIB driver on top of the traditional device drivers (device drivers are specific to the hardware). The RORIB driver calls the lower level disk driver and the NIC driver, through the standard device driver interface, to perform actual I/O operations. This approach has three major advantages over current structures. First, it greatly simplifies the implementation efforts since the RORIB driver avoids the complex task of direct communication with the hardware. Second, the same RORIB driver works with all kinds of disks and NICs in the system because all the low-level disk device drivers use a standard interface. Third, it is easy to transfer the current implementation to other Linux systems.

The data transmitted over the network (e.g., the Internet) between the local and remote systems may be encrypted using SSL (secure socket layer) to provide data security.

Linux is used as the operating system. It is possible to write and incorporate specific device drivers. The device drivers for a class of block devices provide class specific interfaces to that class of device.

Linux supports several different block device drivers. One such device is a network block device (NBD) driver that makes a remote resource look like a local device via TCP layer. NBD exists as kernel module, which means it can be loaded or unloaded at any time.

A prototype RORIB device driver was designed and tested individually (loop back) before integrating it into a network. PostgreSQL was used as the DBMS. The system configuration was two PCs connected over network. Java Servtet runs on the web browser to measure performance. Two sets of experiments were performed. The first experiment compared single-time read and write performance of the proposed backup strategy with the previous discussed backup methods. The second compared burst read and write performance with different time intervals to simulate a real world environment with multi-client connections, again compared to current strategies.

The results of the first experiment were as follows. The read speed of the proposed backup strategy is identical to existing procedures on a single database. This is expected, as backup does not occur until the database is updated.

Figure 3:
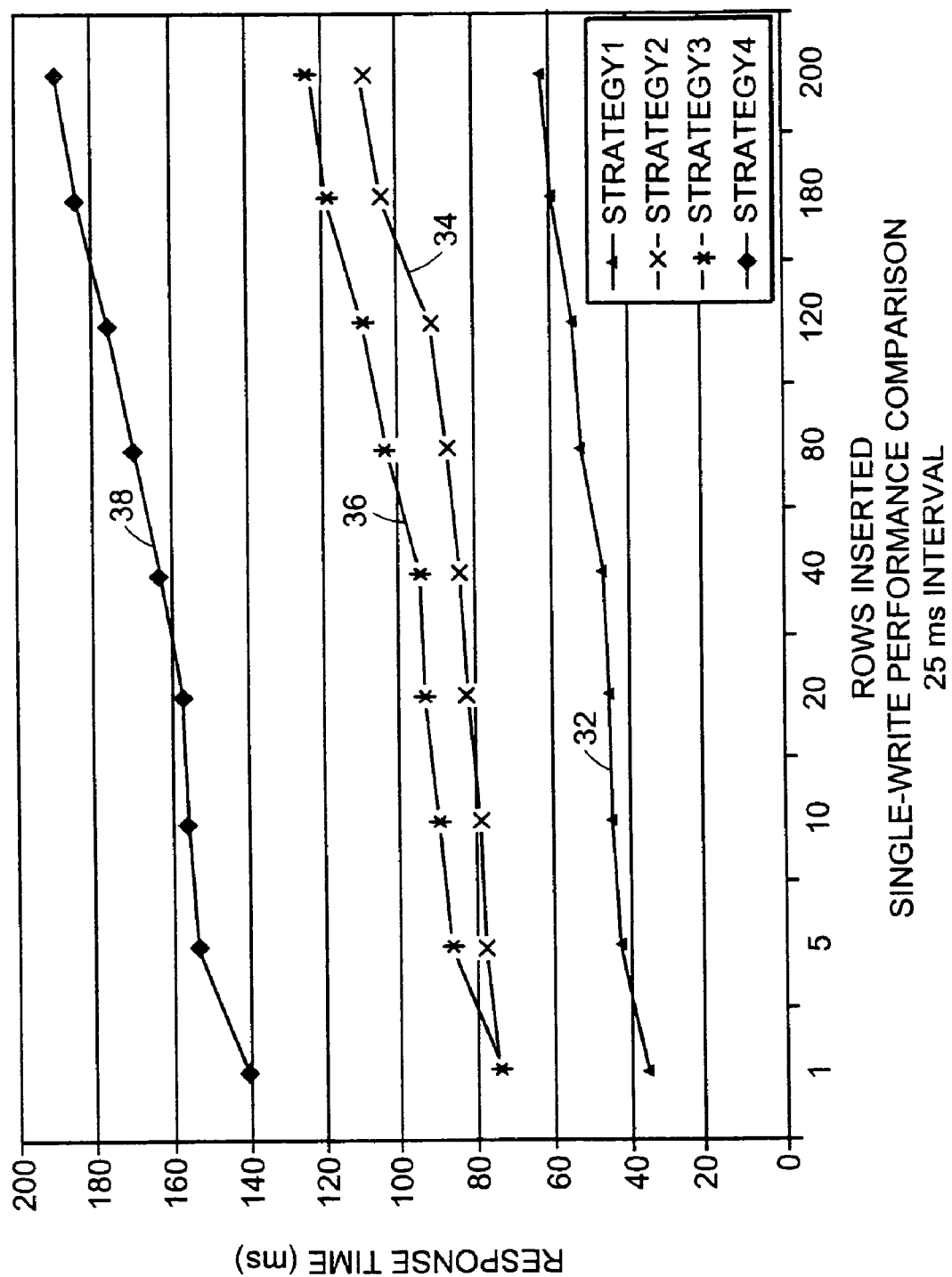
FIG. 3 is a plot of a single-write performance comparison.

Current backup procedures are wholly a software process of the DBMS. Backup is done at the application level. FIG. 3 shows the write performance comparison for a single write. A plot along line 32 (Strategy1) corresponds to a write once to a single database (no backup). Strategy2 along line 34 was to do internet-based real-time online backup using the prototype device driver. Strategy3 along line 36 is to write to two data files on different local disks of the same database on a workstation. This approach simulates an application level local backup solution. Strategy4 along line 38 was to write to databases on two workstations over the Internet. It simulates application level remote backup solution. This experiment shows the backup strategy, based on the proposed driver (strategy2) has faster writing speed than the other backup strategies (strategy3 and strategy4). This is expected as strategy2 eliminates application level overhead. Different computer hardware configuration and network infrastructure setup will affect the backup performance.

Figure 4:
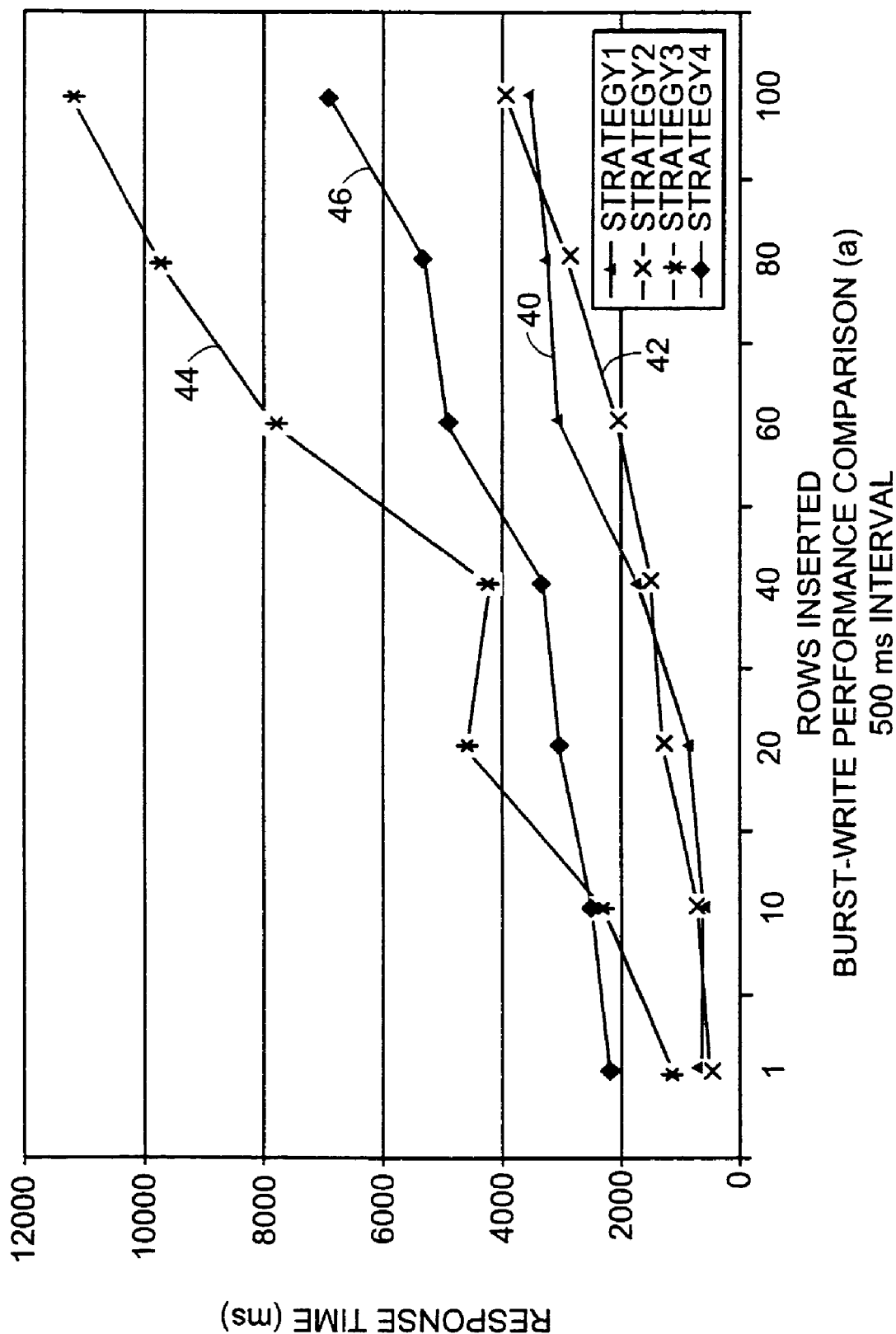
FIG. 4 is a plot of a burst-write performance comparison.
Figure 5:
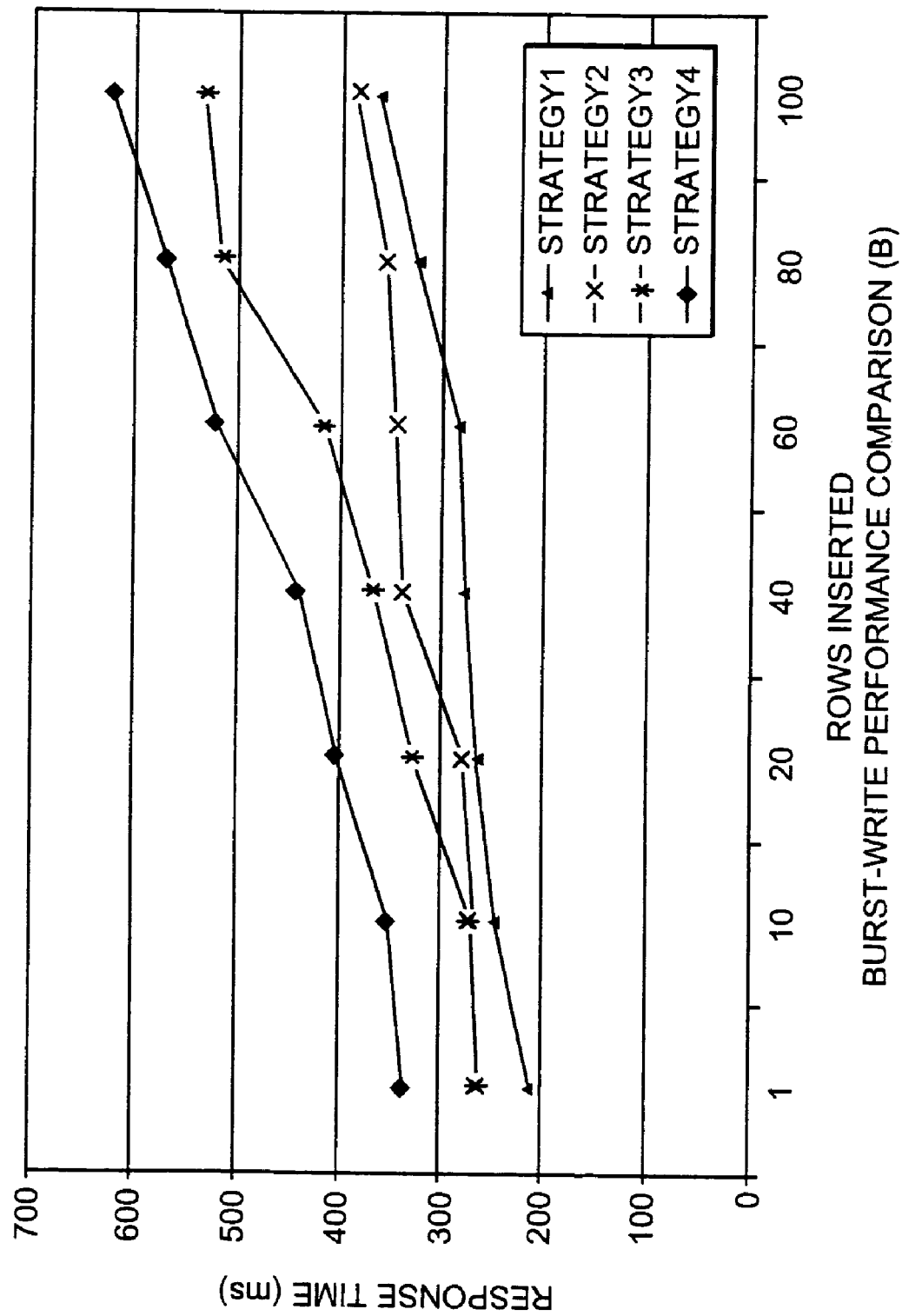
FIG. 5 is a plot of a burst-write performance comparison.

The second experiment is a burst-write performance under different workloads and different time intervals, as shown in FIG. 4. Note that the burst read performance is similar to single read performance. Each point plotted in FIG. 4 represents the response time for a 20-database-insertion (20 threads), simulating twenty (20) clients utilizing the database server at different time intervals. As shown in FIG. 4, there are fluctuations in response time, which is caused by contention. Strategy 1 along line 40 (no backup) and strategy 2 along line 42 (RORIB) still have similar response time for database queries, because strategy 2 along line 42 avoids application level overhead when doing Real-time Online Remote Info Backup. Strategy 3 along line 44 (application level local backup) exhibits greater response time than strategy 4 along line 46 (application level remote backup) under heavier workload, as shown in FIG. 5. At this point, local machine resource contention accounts for more time degradation than network traffic contention. However when there is less local contention, network traffic contention becomes more distinguishable than local resource contention, as shown in FIG. 5.

The backup technique of the present invention is implemented at device driver level. Thus, it is transparent to the user, the file system, and the application programs such as DBMS. It requires no changes to the existing operating system or the physical file structure. As a result, it can be used as a 'drop-in' filter between the traditional disk device driver and the file system in an existing system to obtain immediate functionality.

A prototype of the described RORIB device driver was tested. Results of the proposed driver show significant performance improvements regarding current backup strategies. This performance improvement is achieved without a significant cost increase as would occur using a PBN or a SAN, thus presenting an extremely economically valuable solution to the present alternatives.

The improvement occurs because additional processing requirement is off loaded from application level to device driver level. By utilizing the existing processing capability of hardware technology this can lead to additional file management capabilities residing in hardware devices rather than the current slower software approach in use today.

Although the present invention has been shown and described with respect to several preferred embodiments thereof, various changes, omissions and additions to the form and detail thereof, may be made therein, without departing from the spirit and scope of the invention.

What is claimed is:

1. An information backup system, comprising:
   A. a local computing system including
      (i) a local disk; and
      (ii) a local device driver responsive to requests from a local application executing on said local computing system, for selectively processing calls to said local disk or a remote disk for backup of data resident on said local disk, wherein said local device driver is disposed between a disk driver and a system interface and monitors availability of said local disk, wherein if said local disk is deemed inaccessible by said local device driver, said local device driver routes read/write operations of said local computing system to a remote computing system; and
   B. said remote computing system including
      (i) said remote disk; and
      (ii) a remote device driver responsive to calls from either said local device driver or calls from a remote application executing on said remote computing system, wherein calls from said local device driver are processed to perform backup operations to said remote disk of data resident on said local computing system, wherein said remote device driver is disposed between a remote disk driver and a remote system interface and monitors availability of said remote disk, wherein if said remote disk is deemed inaccessible by said remote device driver, said remote device driver routes read/write operations of said remote computing system to said local computing system.

2. The information backup system of claim 1, wherein said local device driver communicates with a local disk cache disk driver to perform caching in said local computing system.

3. The information backup system of claim 1, wherein said local device driver communicates with a network interface card driver on said local computing system to create a connection with said remote computing system.

4. The information backup system of claim 3, wherein said network interface card driver on said local computing system communicates with said remote computing system via the Internet.

5. The information backup system of claim 3, wherein said network interface card driver on said local computing system communicates with said remote computing system via a LAN or WAN.

6. The information backup system of claim 1, wherein said local device driver does not require any changes to an operating system executing on said local computing system.

7. The information backup system of claim 1, wherein said remote device driver communicates with said local device driver through a network interface card driver on said remote computing system.

8. The information backup system of claim 7, wherein said network interface card driver on said remote computing system communicates with said remote computing system via the Internet.

9. The information backup system of claim 7, wherein said network interface card driver on said remote computing system communicates with said remote computing system via a LAN or WAN.

10. The information backup system of claim 1, wherein said remote driver does not require any changes to an operating system executing on said remote computing system.

11. The information backup system of claim 1, wherein said remote device driver communicates with a local disk cache disk driver to perform caching in said remote computing system.

12. A method of information backup in a distributed environment, said method comprising:
    providing a local device driver on a local computing system responsive to requests from a local application executing on a local computing system, for selectively processing calls to a local disk or a remote disk in said distributed environment for backup of data resident on said local disk, wherein said local device driver operates between a disk driver and a system interface and monitors availability of said local disk, wherein if said local disk is deemed inaccessible by said local device driver, said local device driver routes read/write operations of said local computing system to a remote computing system; and
    providing a remote device driver on said remote computing system responsive to calls from either said local device driver or calls from a remote application executing on a remote computing system, wherein calls from said local device driver are processed to perform backup operations to said remote disk of data resident on said local computing system, wherein said remote device driver operates between a remote disk driver and a remote system interface and monitors availability of said remote disk, wherein if said remote disk is deemed inaccessible by said remote device driver, said remote device driver routes read/write operations of said remote computing system to the said local computing system.

13. The method of claim 12, wherein said local device driver communicates with a local disk cache disk driver to perform caching in said local computing system.

14. The method of claim 12, wherein said local device driver communicates with a network interface card driver on said local computing system to create a connection with said remote computing system.

15. The method of claim 14, wherein said network interface card driver on said local computing system communicates with said remote computing system via the Internet.

16. The method of claim 14, wherein said, network interface card driver on said local computing system communicates with said remote computing system via a LAN or WAN.

17. The method of claim 12, wherein said local device driver does not require any changes to an operating system executing on said local computing system.

18. The method of claim 12, wherein said remote device driver communicates with said local device driver through a network interface card driver on said remote computing system.

19. The method of claim 18, wherein said network interface card driver on said remote computing system communicates with said remote computing system via the Internet.

20. The method of claim 18, wherein said network interface card driver on said remote computing system communicates with said remote computing system via a LAN or WAN.

21. The method of claim 12, wherein said remote driver does not require any changes to an operating system executing on said remote computing system.

22. The method of claim 12, wherein said remote device driver communicates with a local disk cache disk driver to perform caching in said remote computing system.

* * * * *